Nov. 22, 1949  E. H. PIRON  2,488,880
COMBINATION MOTOR FAN AND BRAKE DRUM
Filed May 8, 1946
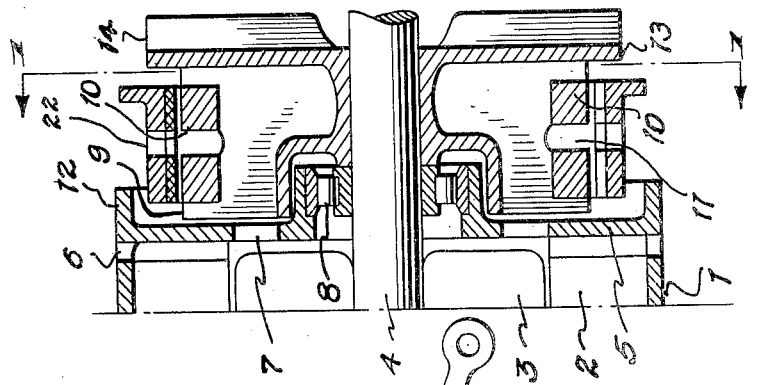
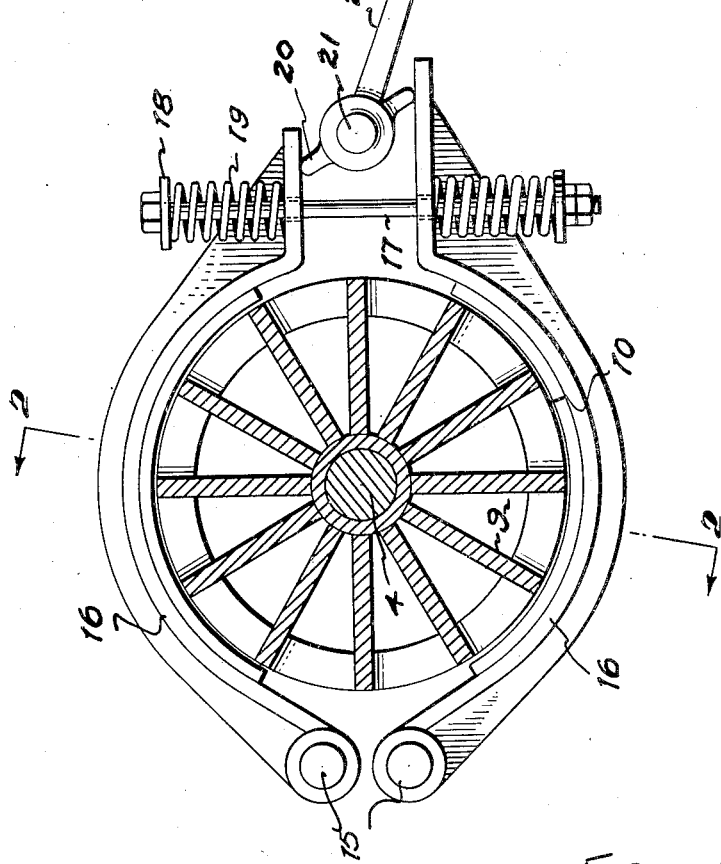
Inventor
EMIL H. PIRON
By Theodore Axis
Attorney Patented Nov. 22, 1949

2,488,880

UNITED STATES PATENT OFFICE 2,488,880

COMBINATION MOTOR FAN AND BRAKE DRUM

Emil H. Piron, New York, N. Y., assignor to Transit Research Corporation, New York, N. Y., a corporation of New York Application May 8, 1946, Serial No. 668,264

9 Claims. (Cl. 172—36)

This invention relates to a combination fan and brake for electric motors and has for its principal object the provision of a fan which will induce a flow of air through the motor and which has a brake drum mounted on the periphery thereof so that the drum and its cooperating shoes will reside in the path of the air delivered by the fan.

It is conventional to provide a fan on the shaft of an electric motor to induce a flow of air therethrough. I propose to increase the width of the blades ordinarily used and to strengthen them so that they are capable of supporting a brake drum and to otherwise accommodate the fan to its dual function. Another object is to provide an insulating air space between the end wall of the motor adjacent the brake and the contained field coils and armature and to open this space to the atmosphere so that the fan will induce a flow of air through this space. The motor windings will thus be protected against damage by heat generated in the brakes.

Another object is to provide an end plate for the fan and to proportion the brake drum and its shoes to less width than the width of the fan blades so that all air is delivered by said fan over and alongside said drum and shoes are also perforated so that air may flow therethrough.

Another object is to provide brake shoes pivotally attached to the housing of the motor and manually controllable.

A further object is to provide a deflector carried by the motor and operable to direct a portion of the air delivered by the fan onto the exterior surface of the brake shoes.

Other objects and advantages will become hereinafter more fully apparent as reference is had to the accompanying drawings wherein my invention is illustrated and in which Figure 1 is a transverse diametric section through my improved fan and brake assembly taken along the line 1—1 of Figure 2, and Figure 2 is a longitudinal diametric section taken along the line 2—2 of Figure 1.

1 indicates the housing of an electric motor having field coils 2, an armature 3 and a shaft 4. The field coils 2 and armature 3 are spaced from the end wall 5 of the housing 4. The field coils 2 and armature 3 are spaced from the end wall 5 of the housing 4 thus forming an air space and this space is open to the atmosphere by virtue of a plurality of openings 6 in the housing 1 adjacent the end wall. The end wall 5 has a plurality of openings 7 therethrough.

A bearing 8, located in the end wall 5, supports the shaft 4 and outwardly of this bearing a fan 9 is keyed or otherwise secured to the shaft. Inset into the periphery of the fan 9 and secured thereto is a continuous brake drum 10. The blades of the fan are wider than the drum and the drum has radial openings 11 between the blades so that air may pass outwardly of the fan past each edge of and directly through the drum. The blades of the fan are not only designed with the necessary strength to properly support the drum but they are also welded to or constructed integrally with the drum so as to be able to drain a substantial part of the heat generated in the drum thereinto. The heat is dissipated into the ventilating air both by the fan blades and by the drum. In order to increase this heat draining function of the blades they are made wider than necessary for purely ventilating purposes and also wider than the brake drum thus increasing their area of contact with the air stream. These wide blades then deliver air at high speed along both sides of the drum and also around the brake shoes as will be explained.

Secured to the blades of the fan 9 is an end plate 13 having heat dissipating fins 14 integral therewith.

Two pins 15 carried by the housing 1 serve as pivots for one end of two brake shoes 16 for the drum 10. A pin 17 extends loosely through the other end of each of the shoes and has a spring seat 18 at each end thereof. Springs 19 between the seats 18 and each shoes urge the shoes against the drum 10 as a brake applying means. A cam 20 pivotally mounted on a pin 21 fixedly mounted on the housing 1 has a manually operable lever 22 by which the brake shoes may be moved against the springs 19 to brake releasing position.

The shoes 16 have approximately the same width as the drum 10. They also have openings 22 substantially aligned with the openings 11. The housing 1 has a flange 12 which diverts the air flowing past one edge of the drum onto the exterior surface of the shoes.

The operation is as follows: elevation of the lever 22 results in an application of the shoes 16 to the drum by the pressure of the springs 19. This causes the drum to heat. The fan 14 rotates at all times when the motor is running because it is fixed on the shaft 4. The fan thus induces a flow of air between the field coils 2 and armature 3 and through the openings 8. It also induces a flow of air through the openings 6, through the space between the end wall 5 and the coils and armature, and through the openings 8. All of the air is then delivered radially outwardly of the blades, past each edge of the drum 10 and through the openings 11 and 22. The flange 12 diverts the air flowing past one edge of the drum 10 and shoes 16 onto the shoes 16.

Various changes may be made without departing from the spirit of the invention and I therefore desire to be extended protection within the scope of the appended claims.

What I claim is:

1. The combination of an electric motor comprising a housing, field coils, an armature and a shaft, and a fan on said shaft adjacent said housing inducing a flow of air between said coils and said armature, said fan having radially arranged blades and a solid end plate thereon, a brake drum mounted on the outer ends of said blades, said drum being located centrally of the periphery of said blades and having less width than said blades whereby air is expelled radially of said blades and directly around and past said drum.

2. The combination of an electric motor comprising a housing, field coils, an armature and a shaft, and a fan on said shaft adjacent said housing inducing a flow of air between said coils and said armature, said fan having radially arranged blades and a solid end plate thereon, a brake drum mounted on the periphery of said fan, said drum having less width than the width of the blades of said fan and being centrally located on the periphery of said blades, said drum also having radial openings therethrough intermediate its edges whereby air may flow alongside each side of said drum and also directly therethrough.

3. The combination of an electric motor comprising a housing having air openings in each end wall thereof, field coils, an armature and a shaft, a fan mounted on said shaft adjacent one of said end walls, said fan having a brake drum mounted on the periphery thereof, said housing having radial openings adjacent said one end wall whereby said fan induces a flow of air longitudinally through said housing and radially through said openings for delivery past said drum, said drum having less width than the width of the blades of said fan, said blades delivering at least a portion of the air over the interior of said drum and outwardly past the edge of said drum remote from said one wall.

4. The combination of an electric motor comprising a housing having air openings in each end wall thereof, field coils, an armature and a shaft, a fan mounted on said shaft adjacent one of said end walls, said fan having a brake drum mounted on the periphery thereof, said housing having radial openings adjacent said one end wall whereby said fan induces a flow of air longitudinally through said housing and radially through said openings for delivery past said drum, said drum having a width less than the width of the blades of said fan and being centrally located on the periphery thereof whereby said fan delivers air past both edges of said drum.

5. The combination of an electric motor comprising a housing having air openings in each end wall thereof, field coils, an armature and a shaft, a fan mounted on said shaft adjacent one of said end walls, said fan having a brake drum mounted on the periphery thereof, said housing having radial openings adjacent said one end wall whereby said fan induces a flow of air longitudinally through said housing and radially through said openings for delivery past said drum, an end plate for said fan having heat dissipating fins on the outer surface thereof, a brake drum secured to the outer edges of the blades of said fan, said drum having a width less than the width of said blades and also having radial openings therethrough between said blades whereby said fan delivers air past both edges of and through said drum.

6. The combination of an electric motor having a shaft, a fan on said shaft for inducing a flow of air through said motor, the blades of said fan being constructed and arranged to deliver air radially of said shaft, a brake drum mounted on the periphery of said fan in the path of the air propelled by said blades, brake shoes outwardly of said drum pivotally mounted on the housing of said motor, and means for applying and retracting said shoes with respect to said drum.

7. The combination of an electric motor having a shaft, a fan on said shaft for inducing a flow of air through said motor, the blades of said fan being constructed and arranged to deliver air radially of said shaft, a brake drum mounted on the periphery of said fan in the path of the air propelled by said blades, external brake shoes pivotally mounted on the housing of said motor, spring means urging said shoes toward each other and into contact with said drum and manually operable cam means for forcing said shoes apart and away from said drum.

8. The combination of an electric motor comprising a housing and a shaft, a fan rotatable with said shaft adjacent said housing, a brake drum carried by the periphery of said fan, brake shoes actuable into and out of frictional engagement with said drum, said fan operating to induce a flow of air through said motor and over and outwardly past said drum and shoes, and a flange extending outwardly from said housing and constituting means for directing a portion of the air onto the outer surfaces of said shoes.

9. The combination of an electric motor comprising a housing and a shaft, a fan mounted on said shaft adjacent said housing, a brake drum inset centrally in the periphery of said fan having a peripheral friction surface and having less width than the width of the blades thereof, brake shoes pivotally mounted on said housing movable into and out of brake applying position on said drum, said drum and said shoes having substantially the same width and having substantially aligned holes radially therethrough between the blades of said fan, said housing having a flange radially outwardly of said shoes and in slightly overlapping position with respect thereto and constituting means for deflecting the air delivered past one edge of said shoes and said drum onto the outer surface of said shoes.

EMIL H. PIRON.

REFERENCES CITED

The following references are of record in the file of this patent:

UNITED STATES PATENTS

| Number | Name | Date |
|---|---|---|
| 1,578,918 | Powell | Mar. 30, 1926 |
| 1,586,742 | Hey | June 1, 1926 |
| 1,816,920 | Sutcliffe | Aug. 4, 1931 |
| 1,998,087 | Koch | Apr. 16, 1935 |

FOREIGN PATENTS

| Number | Country | Date |
|---|---|---|
| 232,063 | Great Britain | Aug. 16, 1925 |
| 458,332 | Germany | Apr. 4, 1928 |